(12) United States Patent
Kim et al.

(10) Patent No.: US 11,014,469 B2
(45) Date of Patent: May 25, 2021

(54) POWER RELAY ASSEMBLY AND METHOD CONTROLLING SEQUENCE OF RELAYS THEREIN

(71) Applicants: Hyundai Motor Company, Seoul (KR); Kia Motors Corporation, Seoul (KR)

(72) Inventors: Mi Ok Kim, Gyeonggi-do (KR); Do Sung Hwang, Gyeonggi-do (KR); Bo Seon Lee, Seoul (KR); Beom Gyu Kim, Gyeonggi-do (KR); Jong Hu Yoon, Gyeonggi-do (KR); Hyun Soo Park, Gyeonggi-do (KR); Tae Hwan Chung, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 304 days.

(21) Appl. No.: 16/196,381

(22) Filed: Nov. 20, 2018

(65) Prior Publication Data

US 2019/0173292 A1   Jun. 6, 2019

(30) Foreign Application Priority Data

Dec. 1, 2017  (KR) .......................... 10-2017-0164102

(51) Int. Cl.
*H01M 10/44*   (2006.01)
*H01M 10/46*   (2006.01)
(Continued)

(52) U.S. Cl.
CPC .............. *B60L 58/10* (2019.02); *B60L 3/0046* (2013.01); *B60L 53/30* (2019.02); *H02J 7/007* (2013.01); *B60L 2270/20* (2013.01)

(58) Field of Classification Search
CPC .......... B60L 58/10; B60L 58/12; B60L 58/40; B60L 53/30; B60L 3/0046; H02J 7/0029;
(Continued)

(56) References Cited

U.S. PATENT DOCUMENTS

2007/0139005 A1\*  6/2007  Osawa .................. H02J 7/0029
                                                            320/115
2013/0264995 A1\* 10/2013  Lee ......................... B60L 58/12
                                                            320/104

(Continued)

*Primary Examiner* — Edward Tso
(74) *Attorney, Agent, or Firm* — Mintz Levin Cohn Ferris Glovsky and Popeo, P.C.; Peter F. Corless

(57) ABSTRACT

A power relay assembly (PRA) and a method of controlling the same are provided. The power relay assembly includes a first main relay for interconnecting negative voltages of a battery and an inverter, a second main relay for interconnecting positive voltages of the battery and the inverter, and a pre-charge relay connected in parallel to the second main relay. A controller executes the open or short sequence of the first main relay, the second main relay, and the pre-charge relay based on the opening and closing operation between the battery and the inverter or the charging and discharging operation of the battery. The opening and closing operation is divided into an opening operation and a closing operation between the battery and the inverter, and the charging and discharging operation is divided into a charging operation and a discharging operation of the battery.

17 Claims, 10 Drawing Sheets

(51) Int. Cl.
*B60L 58/10* (2019.01)
*H02J 7/00* (2006.01)
*B60L 53/30* (2019.01)
*B60L 3/00* (2019.01)

(58) Field of Classification Search
CPC ........ H02J 7/0047; H02J 7/0021; H02J 7/027; H02J 7/007; Y02T 10/70; Y02T 90/12; B60Y 2200/91
USPC ................ 320/127, 132, 134, 135, 136, 148
See application file for complete search history.

(56) References Cited

U.S. PATENT DOCUMENTS

| 2015/0054517 | A1* | 2/2015 | Yonezaki | B60L 3/0046 |
| | | | | 324/418 |
| 2017/0106765 | A1* | 4/2017 | Kim | H02J 7/0047 |
| 2018/0162233 | A1* | 6/2018 | Oya | B60L 58/40 |

* cited by examiner

POWER RELAY ASSEMBLY AND METHOD CONTROLLING SEQUENCE OF RELAYS THEREIN

CROSS REFERENCE TO RELATED APPLICATION(S)

This application claims the benefit of Korean Patent Application No. 10-2017-0164102, filed on Dec. 1, 2017 which is hereby incorporated by reference as if fully set forth herein.

BACKGROUND

Field of the Invention

The present invention relates to a power relay assembly (PRA) provided in a vehicle and a method of controlling the same, and more particularly, to a PRA that controls an opening and closing sequence of relays therein.

Discussion of the Related Art

Each of an electric vehicle (EV), a hybrid electric vehicle (HEV), and a plug-in hybrid electric vehicle (PHEV) is equipped with a driving motor, which uses electrical energy. The driving motor may receive electrical energy from a high-voltage battery, or may supply electrical energy to the high-voltage battery. A power relay assembly (PRA) may be disposed between the high-voltage battery and the driving motor to control the discharge or charge of the high-voltage battery. The power relay assembly may perform an opening and closing operation between the high-voltage battery and the driving motor to perform charge or discharge.

In general, the opening and closing operation of the power relay assembly is performed in a predetermined sequence based on the state of the vehicle. A specific element of the power relay assembly may be burned by inrush current or breaking current generated as the result of the opening and closing operation of the power relay assembly. A relay may be burned by flames, heat, or other transient phenomena accompanying the opening and closing operation of the power relay assembly. As a result, it is necessary to replace the entire power relay assembly even though only a specific element of the power relay assembly is damaged.

Therefore, there is a need for a method of controlling a plurality of relays included in the power relay assembly to prevent a specific one of the relays from being relatively excessively burned.

SUMMARY

Accordingly, the present invention provides a method of controlling a power relay assembly that is capable of controlling the opening and closing sequence of a plurality of relays included in the power relay assembly based on the state of a vehicle without fixing the opening and closing sequence of the relays.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a power relay assembly (PRA) may include a first main relay for interconnecting negative voltages of a battery and an inverter, a second main relay for interconnecting positive voltages of the battery and the inverter, a pre-charge relay connected in parallel to the second main relay, and a controller configured to execute the open or short sequence of the first main relay, the second main relay, and the pre-charge relay based on the opening and closing operation between the battery and the inverter or the charging and discharging operation of the battery. The opening and closing operation may be divided into an opening operation and a closing operation between the battery and the inverter, and the charging and discharging operation may be divided into a charging operation and a discharging operation of the battery.

When the closing operation is performed an N-th time (N being an integer equal to or greater than 1), the controller may be configured to short the pre-charge relay and then short the first main relay, and when the closing operation is performed an (N+1)-th time, the controller may be configured to short the first main relay and then short the pre-charge relay. The controller may also be configured to divide the charging operation and the discharging operation from each other in consideration of the direction in which current flows from the battery to the inverter.

When the opening operation is required during the charging operation, the controller may be configured to open the second main relay and then open the first main relay, and when the opening operation is required during the discharging operation, the controller may be configured to open the first main relay and then open the second main relay. When the opening operation is performed an N-th time (N being an integer equal to or greater than 1) when current between the battery and the inverter is 0, the controller may be configured to open the second main relay and then open the first main relay, and when the opening operation is performed an (N+1)-th time, the controller may be configured to open the first main relay and then open the second main relay.

When the closing operation is performed (3N+1)-th and (3N+2)-th times (N being an integer equal to or greater than 0), the controller may be configured to short the pre-charge relay and then short the first main relay, and when the closing operation is performed a 3N-th time, the controller may be configured o short the first main relay and then short the pre-charge relay. When the opening operation is required (3N+1)-th and (3N+2)-th times (N being an integer equal to or greater than 1) during the charging operation, the controller may be configured to open the second main relay and then open the first main relay, and when the opening operation is required a 3N-th time during the discharging operation, the controller may be configured to open the first main relay and then open the second main relay. The controller may be included in a battery management system (BMS). The power relay assembly may further include a pre-charge resistor connected in series to the pre-charge relay.

In another aspect of the present invention, a method of controlling a power relay assembly (PRA) may include determining whether the opening and closing operation required between a battery and an inverter is one of an opening operation and a closing operation, calculating the number of times that the closing operation is performed when the closing operation is required, and executing the open or short sequence of a first main relay for interconnecting negative voltages of the battery and the inverter, a second main relay for interconnecting positive voltages of the battery and the inverter, and a pre-charge relay connected to the second main relay in parallel based on the number of times.

The execution of the sequence may include shorting the pre-charge relay and then shorting the first main relay when the closing operation is performed an N-th time (N being an integer equal to or greater than 1), and shorting the first main relay and then shorting the pre-charge relay when the closing operation is performed an (N+1)-th time. The method may further include executing the open or short sequence of the first main relay, the second main relay, and the pre-charge relay in consideration of the charging and discharging operation of the battery between the battery and the inverter when the opening operation is required. Further, the charging and discharging operation may be divided into a charging operation and a discharging operation of the battery.

The method may further include dividing the charging operation and the discharging operation from each other in consideration of the direction in which current flows from the battery to the inverter when the opening operation is required. Additionally, the method may include opening the second main relay and then opening the first main relay when the opening operation is required during the charging operation, and opening the first main relay and then opening the second main relay when the opening operation is required during the discharging operation.

The method may further include opening the second main relay and then opening the first main relay when the opening operation is performed an N-th time (N being an integer equal to or greater than 1) when current between the battery and the inverter is 0, and opening the first main relay and then opening the second main relay when the opening operation is performed an (N+1)-th time. The method may include shorting the pre-charge relay and then shorting the first main relay when the closing operation is performed (3N+1)-th and (3N+2)-th times (N being an integer equal to or greater than 0), and shorting the first main relay and then shorting the pre-charge relay when the closing operation is performed a 3N-th time.

Additionally, the method may include opening the second main relay and then opening the first main relay in the case when is required (3N+1)-th and (3N+2)-th times (N being an integer equal to or greater than 1) during the charging operation, and opening the first main relay and then opening the second main relay when the opening operation is required a 3N-th time during the discharging operation.

In a further aspect of the present invention, a non-transitory computer-readable recoding medium containing a program is provided for performing the method. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
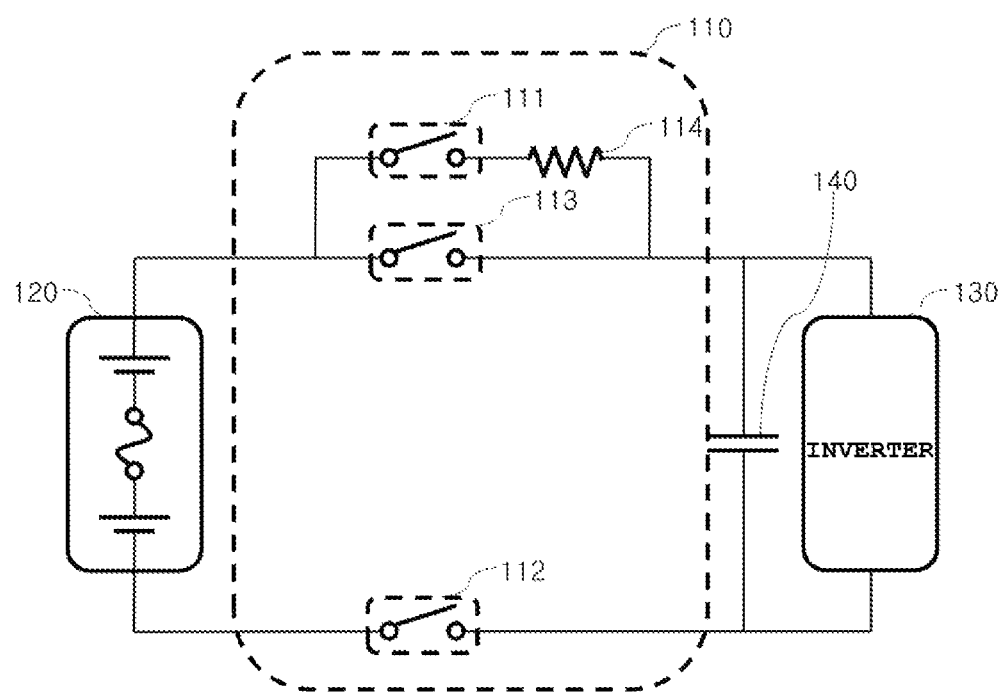
FIG. 1 is a circuit diagram schematically showing a power relay assembly of an electric vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although all elements constituting the exemplary embodiments of the present invention are described as being integrated into a single one or as being operated as a single one, the present invention is not necessarily limited to such embodiments. According to embodiments, all of the elements may be selectively integrated into one or more, and may be operated as one or more within the object and the scope of the present invention. Each of the elements may be implemented as independent pieces of hardware. Alternatively, some or all of the elements may be selectively combined into a computer program having a program module performing some or all functions combined in one or more pieces of hardware. A plurality of lines of code and code segments constituting the computer program may be easily understood by those skilled in the art to which the present invention pertains. The computer program may be stored in computer-readable media such that the computer program is read and executed by a computer to implement embodiments of the present invention. Computer program storage media may include magnetic recording media, optical recording media, and carrier wave media.

In description of exemplary embodiments, it will be understood that, when an element is referred to as being "on" or "under" and "before" or "after" another element, the element can be directly disposed in relation to the other element, or intervening elements may be present. All terms including technical or scientific terms have the same meanings as those generally understood by a person having ordinary skill in the art to which the present invention pertains unless mentioned otherwise. Generally used terms, such as terms defined in a dictionary, should be interpreted to coincide with meanings of the related art from the context. Unless differently defined in the present invention, such terms should not be interpreted in an ideal or excessively formal manner.

It will be understood that, although the terms "first", "second", "A", "B", "(a)", "(b)", etc. may be used herein to describe various elements of the present invention, these terms are only used to distinguish one element from another element, and the essential, order, or sequence of corresponding elements is not limited by these terms. It will be understood that when one element is referred to as being "connected to", "coupled to", or "accessing" another element, the element may be "connected to", "coupled to", or "accessing" the other element via a further element, or the element may be directly connected to or directly access the other element.

In the following description of the at least one embodiment, a detailed description of known functions and configurations incorporated herein will be omitted for the purpose of clarity and for brevity.

A hybrid power control unit (hereinafter, referred to as a "HPCU") or controller may be configured to operate a driving motor and a high-voltage battery. The HPCU may include a driving motor, a hybrid starter generator (HSG), a hybrid control unit (HCU) configured to distribute driving force of a vehicle and manage vehicle driving modes, a low voltage direct current-direct current (DC-DC) converter (LDC) configured to supply power to a plurality of electric control units (ECUs) provided within the vehicle and configured to charge an auxiliary battery, and a power relay assembly (PRA) configured to execute the opening and closing operation between the high-voltage battery and the inverter based on the state of the vehicle.

FIG. 1 is a circuit diagram schematically showing a power relay assembly of an electric vehicle according to an exemplary embodiment of the present invention. Referring to FIG. 1, the power relay assembly 110 may be included in a high-voltage power circuit, disposed between a high-voltage battery 120 and an inverter 130.

A driving motor (not shown) may be configured to receive alternating current (AC) power converted by the inverter 130. The inverter 130 may be configured to convert direct current (DC) power output from the high-voltage battery 120 to AC power. Current in the high-voltage battery may be adjusted by the power relay assembly 110, which includes a pre-charge relay 111, a first main relay 112, and a second main relay 113. According to exemplary embodiments, the power relay assembly 110 may further include a current sensor (not shown). The current sensor may be configured to sense the direction in which current flows between the high-voltage battery 120 and the inverter 130.

The high-voltage battery 120 may be configured to store high-voltage power. The power relay assembly 110, which includes a plurality of relays, may be configured to apply the high-voltage power to the inverter 130, or interrupt the application of the high-voltage power to the inverter 130. According to exemplary embodiments, the inverter 130 may be included in a hybrid power control unit configured to operate the driving motor. The power relay assembly 110 may include a negative (−) end main relay 112 (hereinafter, referred to as a "first main relay") installed in a negative (−) power line for interconnecting the high-voltage battery 120 and the inverter 130, a positive (+) end main relay 113 (hereinafter, referred to as a "second main relay") installed in a positive (+) power line for interconnecting the high-voltage battery 120 and the inverter 130, a pre-charge relay 111 connected to the second main relay 113 in parallel, and a pre-charge resistor 114 connected to the rear end of the pre-charge relay 111.

At the front end of the inverter 130, a DC link capacitor 140 may be connected to the high-voltage battery 120 and the inverter 130 in parallel. The inverter 130 may be configured to convert DC power output from the high-voltage battery 120 to AC power, and supply the AC power to the driving motor to operate the driving motor. According to exemplary embodiments, the DC link capacitor 140 may be included in the inverter 130. The power relay assembly 110 may be configured to execute opening and closing of the pre-charge relay 111, the first main relay 112, and the second main relay 113 to apply the high voltage output from the high-voltage battery 120 to the inverter 130 or to interrupt the application of high voltage output from the high-voltage battery 120 to the inverter 130.

Figure 2:
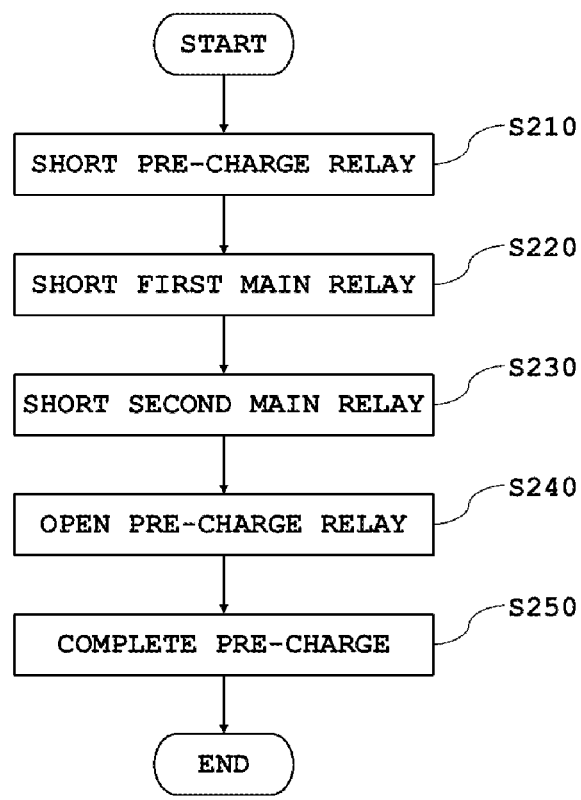
FIG. 2 is a flowchart illustrating a method of controlling the power relay assembly according to an exemplary embodiment of the present invention.
Figure 3:
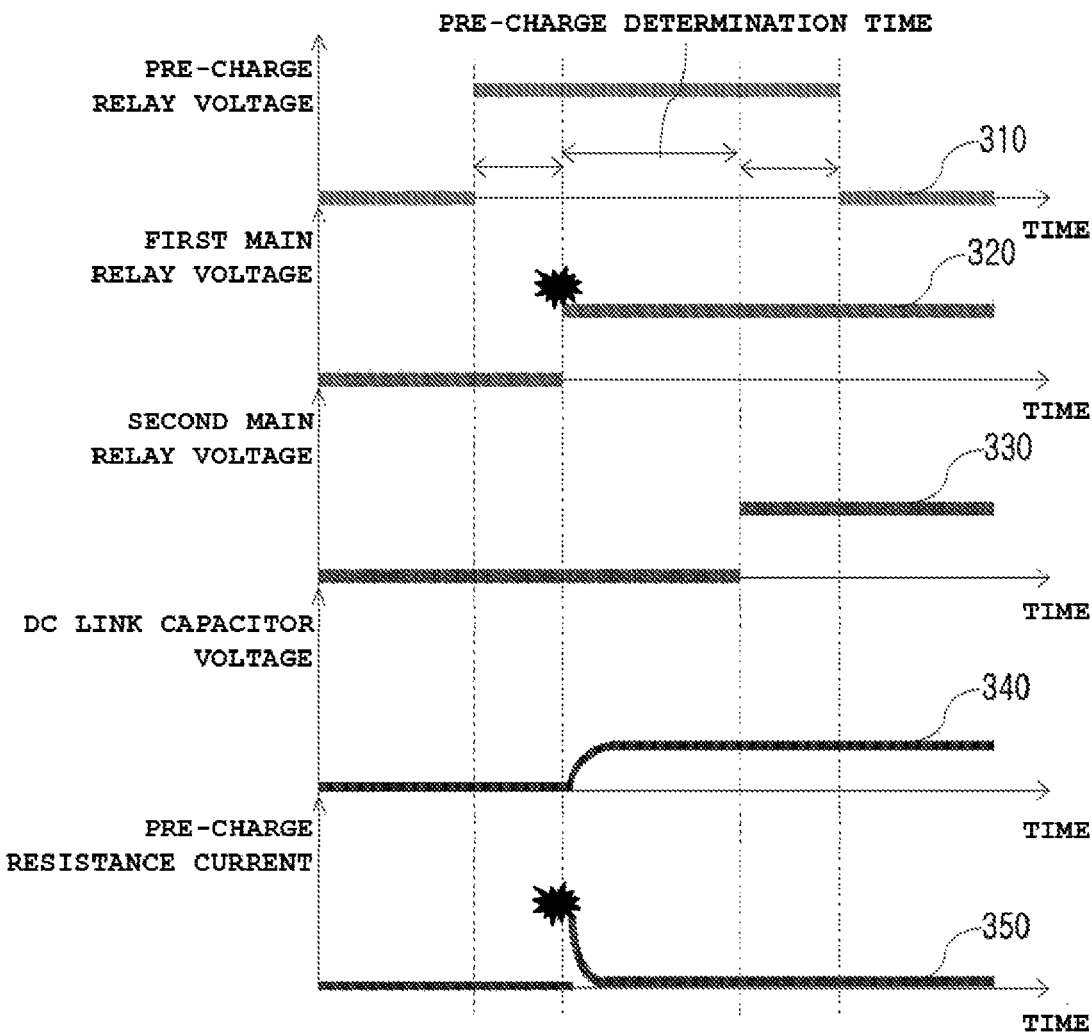
FIG. 3 is a view illustrating limitations that occur in the method of controlling the power relay assembly according to an exemplary embodiment of the present invention.

FIG. 2 is a flowchart illustrating a method of controlling a general power relay assembly, and FIG. 3 is a view illustrating limitations that occur in the method of controlling the general power relay assembly. A predetermined opening and closing sequence of the pre-charge relay 111, the first main relay 112, and the second main relay 113 will be described with reference to FIG. 2, and problems that occur in the fixed opening and closing sequence will be described with reference to FIG. 3.

The power relay assembly 110 may be configured to receive an external signal for applying high voltage output from the high-voltage battery 120 to the inverter 130. According to exemplary embodiments, the power relay assembly 110 may be configured to receive an application signal from the hybrid power control unit. Upon receiving a high-voltage application signal (a relay-on signal), the power relay assembly 110 may be configured to short the pre-charge relay 111 according to the predetermined fixed sequence (S210).

When the pre-charge relay 111 is shorted, the power relay assembly 110 may be configured to short the first main relay 112 (S220). When the first main relay 112 is shorted, inrush current is generated. As a result, a predetermined voltage may be applied to the DC link capacitor 140, whereby an electric charge accumulates to provide energy with which the DC link capacitor is charged. In order words, when the first main relay 112 is shorted, the DC link capacitor 140 may be charged through the resistor. When the DC link capacitor 140 is charged through the pre-charge relay 111, as described above, it may be possible to prevent the occurrence of an arc when the second main relay 113 is shorted (S230).

After the second main relay 113 is shorted, the power relay assembly 110 may be configured to open the pre-charge relay (S240), and the power relay assembly 110 may be configured to determine that pre-charge has been completed. According to exemplary embodiments, the power relay assembly 110 may be configured to open the pre-charge relay 111 when the voltage of the DC link capacitor 140 reaches a predetermined voltage after the second main relay 113 is shorted. When the voltage of the DC link capacitor 140 becomes equal to or greater than a predetermined voltage, the power relay assembly may be configured to determine that pre-charge has been completed. For example, the predetermined voltage may be 92% of the voltage of the high-voltage battery.

When the voltage of the DC link capacitor 140 reaches a predetermined percentage of the voltage of the high-voltage battery (e.g., about 92%) in a pre-charge determination time, the power relay assembly may be configured to determine that pre-charge has been completed. After pre-charge has been completed, a vehicle may start. In contrast, when the voltage of the DC link capacitor 140 does not reach a predetermined percentage of the voltage of the high-voltage battery (e.g., about 92%) in the pre-charge determination time, the power relay assembly may be configured to determine that pre-charge has failed.

Referring to FIG. 3, inrush current is generated in the pre-charge resistor 114 when the first main relay 112 is shorted, and an arc generated due to discontinuous current or voltage may damage the first main relay 112. When the predetermined opening and closing sequence of the relays is repeated, as shown in FIG. 2, the first main relay 112 may be damaged progressively, compared to the pre-charge relay 111 and the second main relay 113, which may reduce the overall durability of the power relay assembly 110.

In contrast, the first main relay 112 and the second main relay 113 may be opened simultaneously to interrupt the connection between the high-voltage battery 120 and the inverter 130. In particular, however, it may be difficult to open the first main relay and the second main relay at exactly the same time compared to the speed of electric charges. As a result, one of the first main relay 112 and the second main relay 113 may be opened first. Furthermore, the relays may operate at different times due to deterioration of the relays.

After opening one of the first main relay 112 and the second main relay 113, the power relay assembly 110 may open the other to interrupt the connection between the high-voltage battery 120 and the inverter 130. When one of the first main relay 112 and the second main relay 113 is repeatedly opened even when the connection between the high-voltage battery 120 and the inverter 130 is interrupted, an arc generated due to breaking current may burn one of the first main relay 112 and the second main relay 113.

The high-voltage battery 120, configured to execute the open or short sequence of the first main relay 112, the second main relay 113, and the pre-charge relay 111 based on the opening and closing operation between the high-voltage battery 120 and the inverter 130 or the charging and discharging operation of the high-voltage battery 120 to prevent relatively excessive burning of a specific relay included in the power relay assembly 110, will be described in detail with reference to FIGS. 4 to 8.

Figure 4:
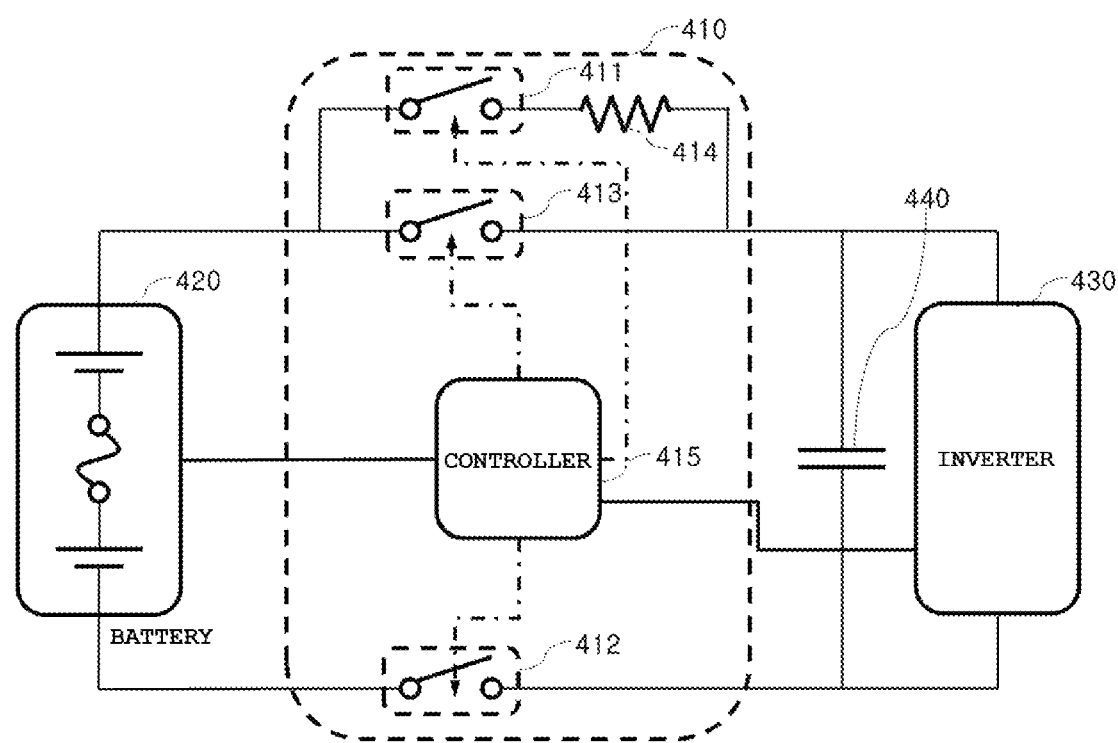
FIG. 4 is a view illustrating the construction of a power relay assembly according to an exemplary embodiment of the present invention.

FIG. 4 is a view illustrating the construction of a power relay assembly according to an exemplary embodiment of the present invention. Referring to FIG. 4, the power relay assembly 410 may be configured to supply voltage output from a high-voltage battery 420 to a driving system including an inverter 430, or interrupt the supply of voltage output from the high-voltage battery to the driving system.

The power relay assembly 410 may include a first main relay 412 for interconnecting negative voltages of the high-voltage battery 420 and the inverter 430, a second main relay 413 for interconnecting positive voltages of the high-voltage battery 420 and the inverter 430, a pre-charge relay 411 connected in parallel to the second main relay, and a controller 415 configured to execute the open or short sequence of the first main relay 412, the second main relay 413, and the pre-charge relay 411 based on the opening and closing operation between the high-voltage battery 420 and the inverter 430 or the charging and discharging operation of the high-voltage battery 420. The elements shown in FIG. 4 are not indispensable, and therefore it is possible to realize a power relay assembly 410 including a larger number of elements or a fewer elements.

The opening and closing operation between the high-voltage battery 420 and the inverter 430, which is performed by the power relay assembly 410, may be divided into an opening operation and a closing operation. In response to receiving an external signal for applying high voltage output from the high-voltage battery 420 to the inverter 430, the power relay assembly 410 may be configured to perform a closing operation to interconnect the high-voltage battery 420 and the inverter 430. In contrast, in response to receiving an external signal for interrupting the application of high voltage output from the high-voltage battery 420 to the inverter 430, the power relay assembly 410 may be configured to perform an opening operation to interrupt the connection between the high-voltage battery 420 and the inverter 430.

The controller 415 may be configured to monitor the direction in which current flows from the high-voltage battery 420 to the inverter 430 through a current sensor, and determine whether the high-voltage battery 420 performs a charging operation or a discharging operation based on the direction in which current flows. In other words, the charging and discharging operation of the high-voltage battery 420 may be divided into a charging operation and a discharging operation of the high-voltage battery 420.

The first main relay 412, the second main relay 413, and the pre-charge relay 411 may electrically interconnect the high-voltage battery 420 and the inverter 430 or interrupt the electrical connection between the high-voltage battery 420 and the inverter 430 under the operation of the controller 415. When the power relay assembly 410 receives an external signal for applying high voltage output from the high-voltage battery 420 to the inverter 430, i.e. in response receiving a signal for requesting a closing operation, the controller 415 may be configured to calculate the number of times that the closing operation is requested or the number of times that the closing operation is performed.

Based on the number of times that the closing operation is performed, the controller 415 may be configured to first short one of the pre-charge relay 411 and the first main relay 412 by turns. For example, when the closing operation is performed an odd number-th time, the controller 415 may be configured to first short the pre-charge relay 411, and when the closing operation is performed an even number-th time, the controller 415 may be configured o first short the first main relay 412.

According to exemplary embodiments, when the closing operation is performed an N-th time (N being an integer equal to or greater than 1), the controller 415 may be configured to short the pre-charge relay 411 and then short the first main relay 412. In contrast, when the closing operation is performed an (N+1)-th time, the controller 415 may be configured to short the first main relay 412 and then short the pre-charge relay 411. A detailed description thereof will be given with reference to FIGS. 5A, 5B, and 6. When one of the first main relay 412 and the second main relay 413 is repeatedly opened even when the connection between the high-voltage battery 420 and the inverter 430 is interrupted, an arc generated due to breaking current may burn one of the first main relay 412 and the second main relay 413. Accordingly, the first main relay 412 and the second main relay 413 may be alternately opened.

According to exemplary embodiments, when an opening operation is required while a charging operation is performed, the controller 415 may be configured to open the second main relay 413 and then open the first main relay 412. When an opening operation is required while a discharging operation is performed, the controller 415 may be configured to open the first main relay 412 and then open the second main relay 413.

Further, in response to determining that the high-voltage battery 420 is fully charged, the current between the high-voltage battery 420 and the inverter 430 may be 0. The controller 415 may be configured to receive state information from the high-voltage battery 420 to determine whether the high-voltage battery 420 is fully charged. Even when the high-voltage battery 420 is fully charged, the controller 415 may be configured to alternately open the first main relay 412 and the second main relay 413.

According to exemplary embodiments, when the opening operation is performed an N-th time (N being an integer equal to or greater than 1) in the state in which it is determined that the current between the battery and the inverter is 0, the controller 415 may be configured to open the second main relay 413 and then open the first main relay 412. In contrast, when the opening operation is performed an (N+1)-th time, the controller 415 may be configured to open the first main relay 412 and then open the second main relay 413.

Meanwhile, when the number of times that the opening operation or the closing operation of the three relays is requested is divided into an odd number and an even number, the three relays may not be uniformly burned. The burning extent of the three relays may be determined based on the number of times that the respective relays are opened or shorted. It may be assumed that the closing operation and the opening operation are performed at a ratio of 1:1. When the closing operation is performed (3N+1)-th and (3N+2)-th times (N being an integer equal to or greater than 0), the controller 415 may be configured to short the pre-charge relay 411 and then short the first main relay 412. When the closing operation is performed a 3N-th time, the controller 415 may be configured to short the first main relay 412 and then short the pre-charge relay 411.

According to exemplary embodiments, when the opening operation is required (3N+1)-th and (3N+2)-th times (N being an integer equal to or greater than 1), the controller 415 may be configured to open the second main relay 413 and then open the first main relay 412, and when the opening operation is required a 3N-th time, the controller 415 may be configured to open the first main relay 412 and then open the second main relay 413. Consequently, the burning ratio of the first main relay 412, the second main relay 413, and the pre-charge relay 411 may become 1:1:1 as the result of the closing operation and the opening operation. According to exemplary embodiments, the controller 415 may be included in a battery management system (BMS).

A system for protecting a high-voltage system may be referred to as a battery management system (BMS). Specifically, the battery management system designates a system for operating a battery, since the battery may explode due to overcharging, overheating, or external impact. The battery management system may be configured to monitor the state of the battery indicated based on various types of information. Information indicating the state of the battery may include the voltage of the battery, the temperature of the battery, the state of charge of the battery, the state of health of the battery, the air flow in the battery, and the current input and output states of the battery. In addition, the BMS may be configured to perform calculation necessary for the power supply of the battery based on the above information, and may be connected to an external device to perform communication for receiving and transmitting various types of information. The battery management system may be configured to collect state information of a vehicle using a plurality of sensors to maintain the optimum performance of the high-voltage battery. In particular, the battery management system may be configured to monitor state information of the high-voltage battery 420. According to embodiments, the battery management system may be configured to operate a battery cooling fan to guarantee appropriate operation of the battery.

According to exemplary embodiments, when the high-voltage system breaks down or otherwise malfunctions, the battery management system may be configured to interrupt the supply of power to the power relay assembly 410 to protect a hybrid system. The controller 415 may be configured to determine whether the high-voltage battery 420 is fully charged, and open and short the first main relay 412, the second main relay 413, and the pre-charge relay 411 when the high-voltage battery is fully charged.

Figure 5A:
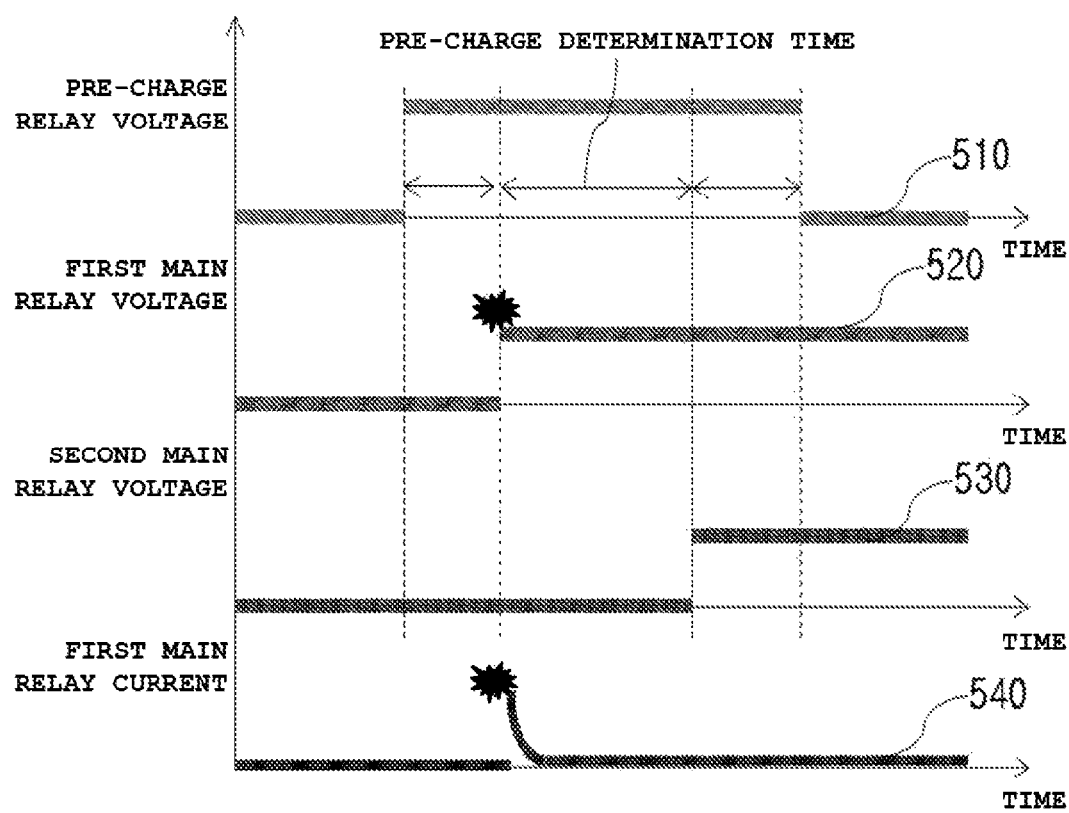
FIGS. 5A and 5B are views illustrating the operation of the power relay assembly when a closing operation according to an exemplary embodiment of the present invention is required.
Figure 5B:
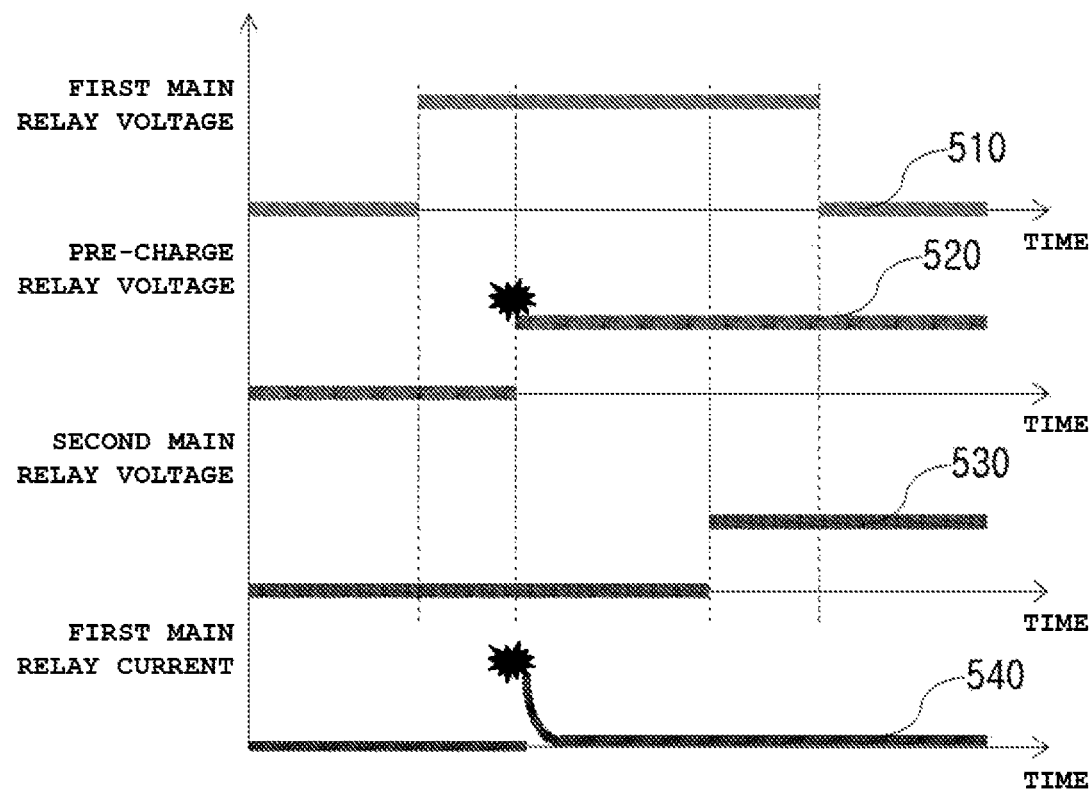
Figure 6:
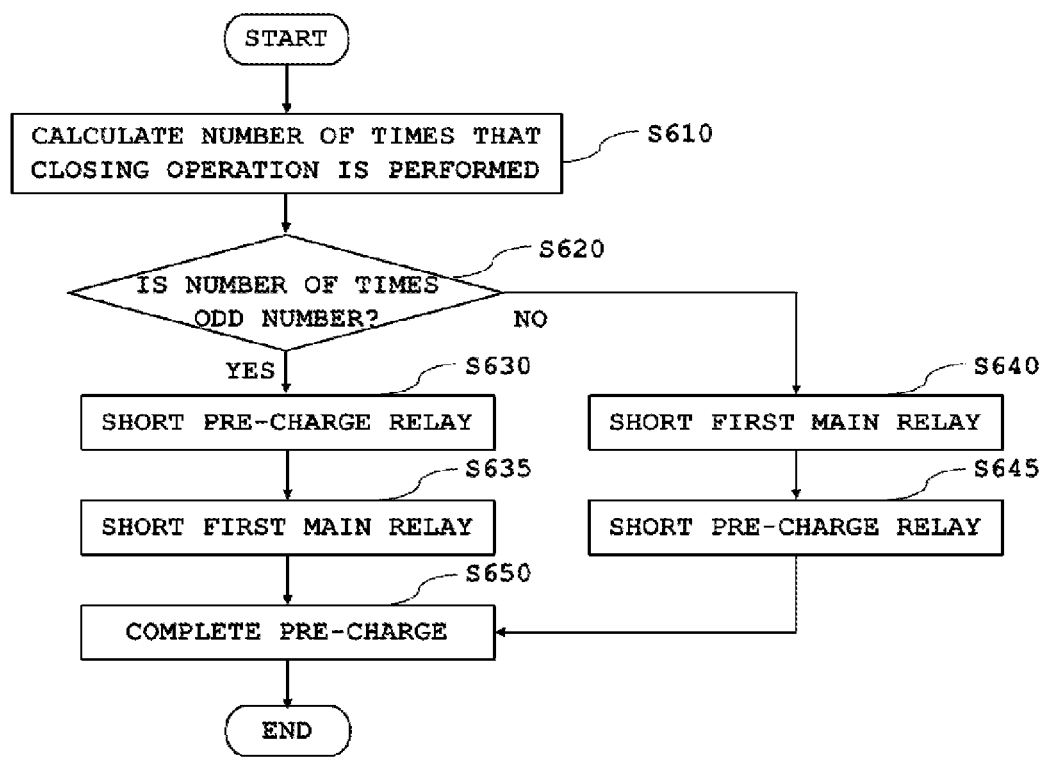
FIG. 6 is a flowchart illustrating the operation of the power relay assembly when the closing operation according to the exemplary embodiment of the present invention is required.

FIGS. 5A and 5B are views illustrating the operation of the power relay assembly when a closing operation according to an exemplary embodiment of the present invention is required, and FIG. 6 is a flowchart illustrating the operation of the power relay assembly when the closing operation according to the exemplary embodiment of the present invention is required. The operation of the power relay assembly when the closing operation is required will be described with reference to FIGS. 5A, 5B, and 6.

Referring to FIGS. 5A and 5B, when the connection between the high-voltage battery and the inverter, i.e. the closing operation, is required, the short sequence of the first main relay and the pre-charge relay may be changed to prevent one of the pre-charge relay and the first main relay from being relatively excessively damaged. It may be considered that the one of the pre-charge relay and the first main relay that is shorted first is shorted in the state in which a difference in voltage between opening and closing ends thereof is 0V. However, the other of the pre-charge relay and the first main relay, which is shorted subsequently, may be shorted in the state in which there is a difference in voltage between opening and closing ends thereof, and may thus be burned due to inrush current.

For example, a relay generally performs the opening and closing operation four hundred thousand times or more when the relay has no difference in voltage. However, the relay performs the opening and closing operation only one hundred and fifty thousand times when the relay has a predetermined difference in voltage (e.g., when inrush current is about 30 A). The overall durability of the power relay assembly may be reduced based on the durability of one of the pre-charge relay and the first main relay. Accordingly, the number of times that the power relay assembly is operated may be limited to the number of times that the one of the pre-charge relay and the first main relay that is more damaged is opened and closed. Consequently, the short sequence of the pre-charge relay and the first main relay may be alternately changed to make the burning extent thereof uniform.

Referring to FIG. 6, the power relay assembly may count the number of times that the closing operation between the high-voltage battery and the inverter is performed (S610). In particular, the power relay assembly may count the number of times that the closing operation is requested from the outside. When the counted number of times is an odd number ("Yes" of S620), the power relay assembly may be configured to short the pre-charge relay (S630), and then short the first main relay (S635). When the counted number of times is an even number ("No" of S620), the power relay assembly may be configured to short the first main relay (S640), and then short the pre-charge relay (S645).

Subsequently, when the voltage of the DC link capacitor becomes equal to or greater than a predetermined voltage, the power relay assembly may be configured to determine that pre-charge has been completed. When the voltage of the DC link capacitor reaches a predetermined percentage of the voltage of the high-voltage battery (e.g., about 92%) in a pre-charge determination time, the power relay assembly may be configured to determine that pre-charge has been completed. After pre-charge has been completed, a vehicle may start. In contrast, when the voltage of the DC link capacitor 140 does not reach a predetermined percentage of the voltage of the high-voltage battery (e.g., about 92%) in the pre-charge determination time, the power relay assembly may be configured to determine that pre-charge has failed.

Figure 7A:
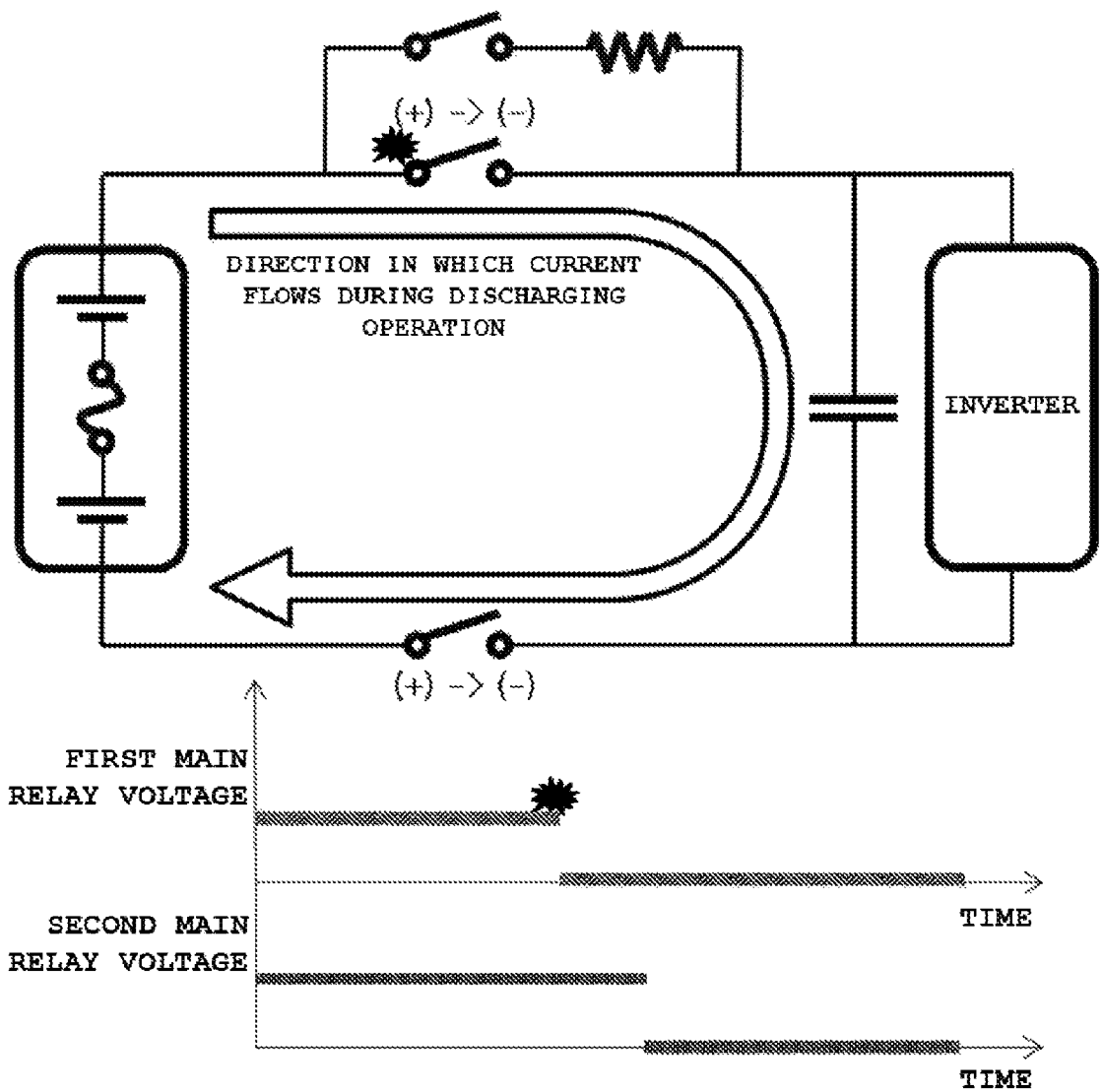
FIGS. 7A and 7B are views illustrating the operation of the power relay assembly when an opening operation according to an exemplary embodiment of the present invention is required.
Figure 7B:
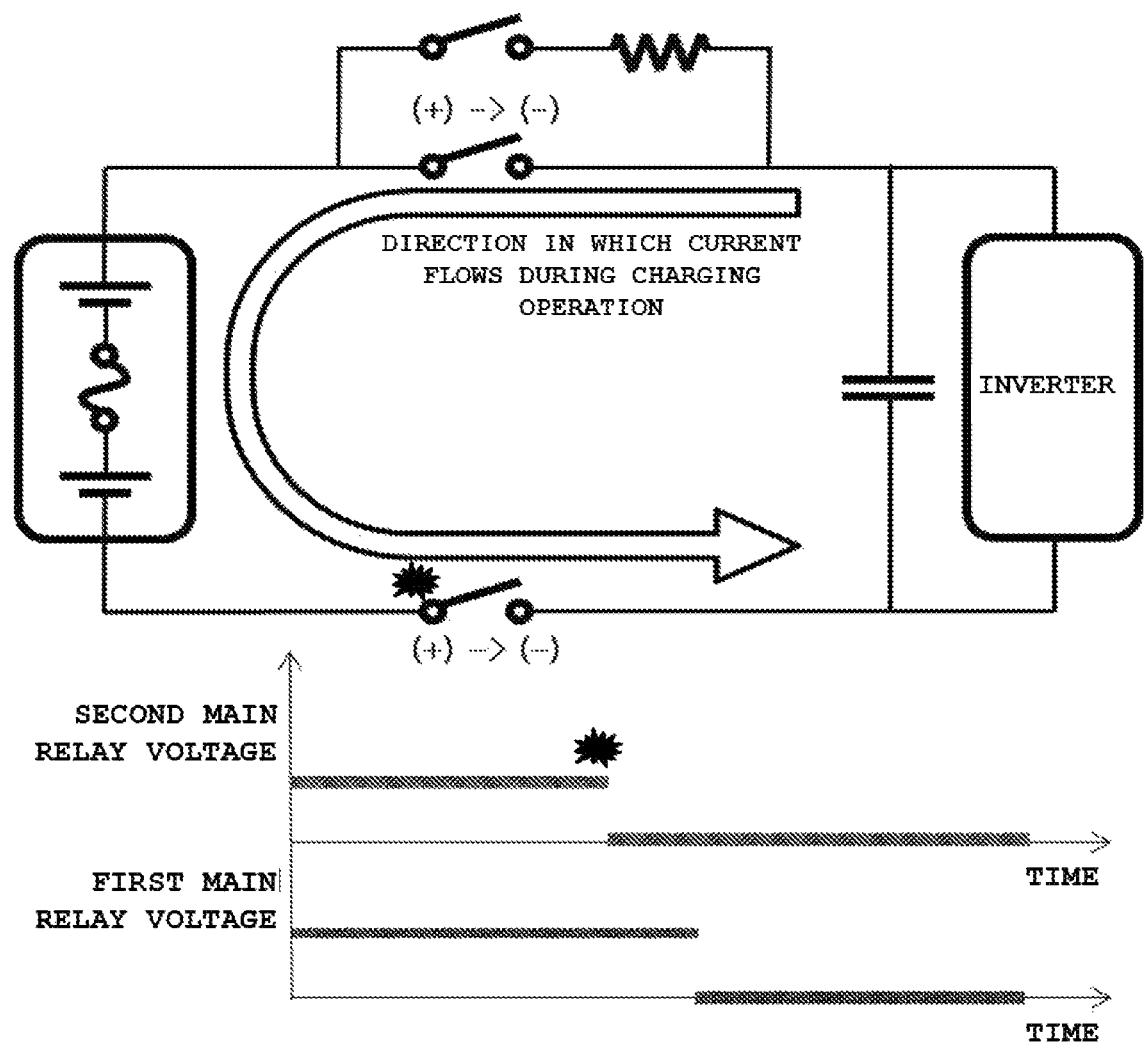
Figure 8:
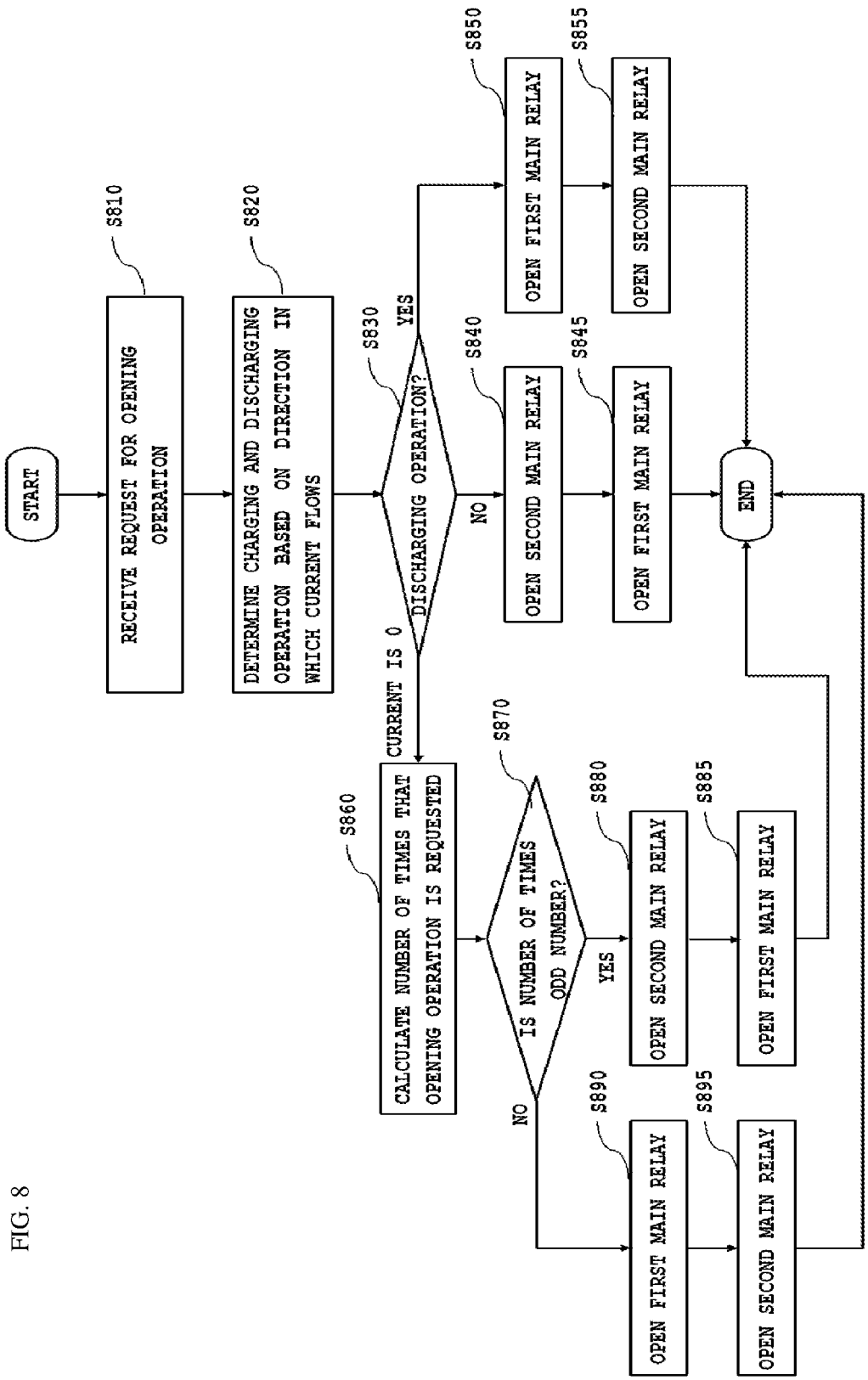
FIG. 8 is a flowchart illustrating the operation of the power relay assembly when the opening operation according to the exemplary embodiment of the present invention is required.

FIGS. 7A and 7B are views illustrating the operation of the power relay assembly when an opening operation according to an exemplary embodiment of the present invention is required, and FIG. 8 is a flowchart illustrating the operation of the power relay assembly when the opening operation according to the exemplary embodiment of the present invention is required. The operation of the power relay assembly when the opening operation is required will be described with reference to FIGS. 7A, 7B, and 8.

Referring to FIGS. 7A and 7B, when the interruption of the connection between the high-voltage battery and the inverter, i.e. the opening operation, is required, the open sequence of the first main relay and the second main relay may be changed to prevent one of the first main relay and the second main relay from being relatively excessively damaged. The one of the first main relay and the second main relay that is opened first may be damaged by breaking current. When the relays are alternately opened, it may be possible to prevent one of the first main relay and the second main relay from being relatively excessively damaged.

The power relay assembly may be configured to receive an external signal for interrupting the application of high voltage output from the high-voltage battery to the inverter. At this time, the power relay assembly may be configured to open one of the first main relay and the second main relay and then open the other to interrupt the connection between the high-voltage battery and the inverter. Subsequently, when the first main relay or the second main relay is opened, the connection between the high-voltage battery and the inverter may be interrupted, and the DC link capacitor may be discharged, whereby the voltage of the DC link capacitor may be reduced.

The power relay assembly may use the charging and discharging operation of the high-voltage battery as the condition for changing the open sequence of the first main relay and the second main relay. When an opening operation is requested during a discharging operation, the power relay assembly may be configured to open the first main relay and then open the second main relay. In contrast, when an opening operation is requested during a charging operation, the power relay assembly may be configured to open the second main relay and then open the first main relay.

Meanwhile, referring to FIG. 7A, current flows in the clockwise direction while the high-voltage battery performs a discharging operation. In contrast, referring to FIG. 7B, current flows in the counterclockwise direction while the high-voltage battery performs a charging operation. In general, when a relay is installed, the positive (+) terminal and the negative (−) terminal of the relay are connected in consideration of the direction in which current flows when the high-voltage battery performs a discharging operation. In other words, the relay may be installed such that the positive (+) terminal is disposed at the point at which current starts to flow and the negative (−) terminal is disposed at the point from which current flows out. The direction in which current flows at this time may be referred to as a discharging direction.

However, the direction in which electric conduction is performed in the relay is not affected by inrush current but by breaking current. Consequently, the first main relay may be installed in a direction (a charging direction) opposite the discharging direction, and the second main relay may be installed in the discharging direction to improve the electric conduction performance thereof.

Referring to FIG. 8, upon receiving a request for an opening operation between the high-voltage battery and the inverter (S810), the power relay assembly may be configured to sense the direction in which current flows between the high-voltage battery and the inverter using a current sensor, and determine whether a charging operation or a discharging operation is performed based on the direction in which current flows (S820). Upon receiving a request for an opening operation during a discharging operation ("Yes" of S830), the power relay assembly may be configured to open the first main relay (S840), and may then open the second main relay (S845). In contrast, upon receiving a request for an opening operation during a charging operation ("No" of S830), the power relay assembly may be configured to open the second main relay (S850), and then open the first main relay (S855).

Meanwhile, when the current between the high-voltage battery and the inverter is 0, the power relay assembly may count the number of times that the opening operation between the high-voltage battery and the inverter is requested from the outside (S860). According to exemplary embodiments, the power relay assembly may count the number of times that the opening operation is performed. When the voltage of the high-voltage battery and the voltage of the inverter are the same, no current may flow. For example, when the high-voltage battery is fully charged during a charging operation, the voltage of the high-voltage battery and the voltage of the inverter may be the same.

When the counted number of times is an odd number ("Yes" of S870), the power relay assembly may be configured to open the second main relay (S880), and then open the first main relay (S885). When the counted number of times is an even number ("No" of S870), the power relay assembly may be configured to open the first main relay (S890), and then open the second main relay (S895).

The aforementioned methods according to exemplary embodiments of the present invention may be implemented as a computer-readable program stored in a non-transitory computer-readable recording medium. Examples of the non-transitory computer-readable recording medium include a read-only memory (ROM), a random access memory (RAM), a compact disc read-only memory (CD-ROM), a magnetic tape, a floppy disk, and an optical data storage device, as well as implementation as carrier waves (e.g., transmission over the Internet). The computer-readable recording medium may also be distributed over network-coupled computer systems so that the computer-readable code is stored and executed in a distributed fashion. Also, functional programs, code, and code segments for accomplishing the aforementioned method can be easily conceived of by programmers skilled in the art to which the present invention pertains.

As is apparent from the above description, a power relay assembly (PRA) and a method of controlling the same according to the present invention have the following effects.

First, it may be possible to prevent some of a plurality of relays included in the power relay assembly from being relatively excessively burned thus improving the overall durability of the power relay assembly.

Second, it may be possible to protect the relays without adding a circuit or a hardware device to a conventional power relay assembly, whereby it may be possible to obtain economic effects.

It will be appreciated by those skilled in the art that effects achievable through the present invention are not limited to what have been particularly described hereinabove and other effects of the present invention will be more clearly understood from the above detailed description. It will be apparent to those skilled in the art that various modifications and variations can be made in the present invention without departing from the spirit or scope of the invention.

The above detailed description is not to be construed as limiting the present invention in any aspect, and is to be considered by way of example. The scope of the present invention should be determined by reasonable interpretation of the accompanying claims, and all equivalent modifications made without departing from the scope of the present invention should be understood to be included in the following claims.

What is claimed is:

1. A power relay assembly (PRA), comprising:
   a first main relay for interconnecting negative voltages of a battery and an inverter;
   a second main relay for interconnecting positive voltages of the battery and the inverter;
   a pre-charge relay connected in parallel to the second main relay; and
   a controller configured to execute an open or short sequence of the first main relay, the second main relay, and the pre-charge relay based on an opening and closing operation between the battery and the inverter or a charging and discharging operation of the battery,
   wherein the opening and closing operation is divided into an opening operation and a closing operation between the battery and the inverter,
   wherein the charging and discharging operation is divided into a charging operation and a discharging operation of the battery,
   wherein when the closing operation is performed an N-th time, the controller is configured to short the pre-charge relay and short the first main relay, wherein N is an integer equal to or greater than 1, and
   wherein when the closing operation is performed an (N+1)-th time, the controller is configured to the first main relay and then short the pre-charge relay.

2. The power relay assembly according to claim 1, wherein the controller is configured to divide the charging operation and the discharging operation from each other based on a direction in which current flows from the battery to the inverter.

3. The power relay assembly according to claim 1, wherein
   when the opening operation is required during the charging operation, the controller is configured to open the second main relay and then open the first main relay, and
   when the opening operation is required during the discharging operation, the controller is configured to open the first main relay and then open the second main relay.

4. The power relay assembly according to claim 1, wherein
   when the opening operation is performed an N-th time in response to determining that current between the battery and the inverter is 0, the controller is configured to open the second main relay and then open the first main relay, wherein N is an integer equal to or greater than 1, and
   when the opening operation is performed an (N+1)-th time, the controller is configured to the first main relay and then open the second main relay.

5. The power relay assembly according to claim 1, wherein
   when the closing operation is performed (3N+1)-th and (3N+2)-th times, the controller is configured to short the pre-charge relay and then short the first main relay, wherein N is an integer equal to or greater than 0, and
   when the closing operation is performed a 3N-th time, the controller is configured to short the first main relay and then shorts the pre-charge relay.

6. The power relay assembly according to claim 5, wherein
   when the opening operation is required (3N+1)-th and (3N+2)-th times during the charging operation, the controller is configured to open the second main relay and then open the first main relay, wherein N is an integer equal to or greater than 1, and when the opening operation is required a 3N-th time during the discharging operation, the controller is configured to open the first main relay and then open the second main relay.

7. The power relay assembly according to claim 1, wherein the controller is included in a battery management system (BMS).

8. The power relay assembly according to claim 1, further comprising:
   a pre-charge resistor connected in series to the pre-charge relay.

9. A method of controlling a power relay assembly (PRA), comprising:
   determining, by a controller, whether an opening and closing operation required between a battery and an inverter is one of an opening operation and a closing operation;
   calculating, by the controller, a number of times that the closing operation is performed when the closing operation is required; and
   executing, by the controller, an open or short sequence of a first main relay for interconnecting negative voltages of the battery and the inverter, a second main relay for interconnecting positive voltages of the battery and the inverter, and a pre-charge relay connected in parallel to the second main relay based on the number of times that the closing operation is performed.

10. The method according to claim 9, wherein the executing of the sequence includes:
   shorting, by the controller, the pre-charge relay and then shorting the first main relay when the closing operation is performed an N-th time, wherein N is an integer equal to or greater than 1; and
   shorting, by the controller, the first main relay and then shorting the pre-charge relay when the closing operation is performed an (N+1)-th time.

11. The method according to claim 9, further comprising:
   executing, by the controller, the open or short sequence of the first main relay, the second main relay, and the pre-charge relay based on a charging and discharging operation of the battery between the battery and the inverter when the opening operation is required, wherein the charging and discharging operation is divided into a charging operation and a discharging operation of the battery.

12. The method according to claim 11, further comprising:
   dividing, by the controller, the charging operation and the discharging operation from each other based on a direction in which current flows from the battery to the inverter when the opening operation is required.

13. The method according to claim 11, further comprising:
   opening, by the controller, the second main relay and then opening the first main relay when the opening operation is required during the charging operation; and
   opening, by the controller, the first main relay and then opening the second main relay when the opening operation is required during the discharging operation.

14. The method according to claim 11, further comprising:
   opening, by the controller, the second main relay and then opening the first main relay when the opening operation is performed an N-th time in response to determining that current between the battery and the inverter is 0, wherein N is an integer equal to or greater than 1; and
   opening, by the controller, the first main relay and then opening the second main relay when the opening operation is performed an (N+1)-th time.

15. The method according to claim 11, further comprising:
   shorting, by the controller, the pre-charge relay and then shorting the first main relay when the closing operation is performed (3N+1)-th and (3N+2)-th times, wherein N is an integer equal to or greater than 0; and
   shorting, by the controller, the first main relay and then shorting the pre-charge relay when the closing operation is performed a 3N-th time.

16. The method according to claim 15, further comprising:
   opening, by the controller, the second main relay and then opening the first main relay when the opening operation is required (3N+1)-th and (3N+2)-th times during the charging operation, wherein N is an integer equal to or greater than 1; and
   opening, by the controller, the first main relay and then opening the second main relay when the opening operation is required a 3N-th time during the discharging operation.

17. A non-transitory computer-readable recoding medium containing a program for performing a method according to claim 9.

* * * * *